United States Patent
Swaffar

(10) Patent No.: US 7,185,432 B2
(45) Date of Patent: Mar. 6, 2007

(54) GAS TURBINE ENGINE TRANSITION LINER ASSEMBLY AND REPAIR

(75) Inventor: R. Glenn Swaffar, Mesa, AZ (US)

(73) Assignee: Honeywell International, Inc., Morristown, NJ (US)

( * ) Notice: Subject to any disclaimer, the term of this patent is extended or adjusted under 35 U.S.C. 154(b) by 112 days.

(21) Appl. No.: 11/068,221

(22) Filed: Feb. 28, 2005

(65) Prior Publication Data

US 2005/0262690 A1    Dec. 1, 2005

Related U.S. Application Data

(62) Division of application No. 10/290,675, filed on Nov. 8, 2002, now Pat. No. 6,925,810.

(51) Int. Cl.
*B23P 6/00* (2006.01)

(52) U.S. Cl. ............... 29/889.1; 29/402.03; 29/402.12; 60/752

(58) Field of Classification Search ............... 29/889.1, 29/889.2, 402.03, 402.12, 897.1, 898.1, 402.04, 29/402.18
See application file for complete search history.

(56) References Cited

U.S. PATENT DOCUMENTS

| 4,822,248 A | 4/1989 | Wertz et al. |
| 5,033,938 A * | 7/1991 | Fraser et al. ................. 416/224 |
| 5,237,813 A | 8/1993 | Harris et al. |
| 5,448,828 A | 9/1995 | Willems et al. |
| 5,851,659 A | 12/1998 | Komuro et al. |
| 5,924,288 A | 7/1999 | Fortuna et al. |
| 6,060,182 A | 5/2000 | Tanaka et al. |
| 6,305,077 B1 | 10/2001 | Conner et al. |
| 6,345,441 B1 | 2/2002 | Farmer et al. |
| 2004/0172826 A1 * | 9/2004 | Memmen et al. .......... 29/889.1 |

* cited by examiner

*Primary Examiner*—William H. Rodriguez
(74) *Attorney, Agent, or Firm*—Ingrassia Fisher & Lorenz

(57) ABSTRACT

A method of repairing a damaged combustion gas transition liner for a gas turbine engine and an improved damage-resistant transition liner that mounts adjacent to the edge of one of the engine's combustion chambers. In a particular embodiment, the gas turbine engine is a reverse flow type and the transition liner has a scalloped, circular shape with a damaged outer edge portion. The outer edge portion of the liner is removed and replaced with a new ring-shaped edge portion. The new ring-shaped edge portion has a layer of damage-resistant material that is more robust than the original liner material. The layer of damage-resistant material is located such that it will be adjacent to the edge of the combustion chamber when the gas turbine engine is reassembled. A new transition liner assembly with the damage-resistant edge also is provided.

21 Claims, 7 Drawing Sheets

GAS TURBINE ENGINE TRANSITION LINER ASSEMBLY AND REPAIR

CROSS REFERENCE TO RELATED APPLICATION

This application is a divisional of Ser. No. 10/290,675 filed on Nov. 8, 2002 now U.S. Pat. No. 6,925,810.

FIELD OF THE INVENTION

This invention relates to gas turbine engines, and in particular, to an improved transition liner assembly for directing the gas flow from the engine's annular combustor to the engine's turbine, and more particularly to a method of repairing damaged transition liners.

BACKGROUND OF THE INVENTION

A gas turbine, or jet, engine may be generalized as having three overall sections: 1) a compressor which receives and compresses incoming gas such as air; 2) a combustion chamber wherein the compressed gas is mixed with fuel and burned to produce exhaust gas; and 3) one or more turbines which extract energy from the high-pressure, high-velocity exhaust gas exiting the combustion chamber.

The arrangement and configuration of these three components impacts many characteristics of the gas turbine engine, including overall engine length and weight, as well as the materials to construct the turbine engine. The overall length of the turbine engine may be shortened, saving on materials, weight and length, by the use of a reverse flow annular combustion chamber. This type of combustion chamber is so named because the mean direction of flow within the chamber is opposite the general direction of air flow through the engine as a whole. A transition liner assembly is fitted to the downstream portion of the annular combustion chamber and serves to redirect the flow of combustion gas into the turbine section resulting in a gas flow aligned with the general direction of overall flow through the engine.

FIG. 1 shows a functional schematic cut-away diagram of one conventional gas turbine engine 10, which includes an air compressing passage 14, a combustion chamber 30, and a turbine 20. More specifically, FIG. 1 shows a portion of the combustor-to-turbine transition assembly which is generally comprised of a transition liner assembly 51 mounted adjacent to a combustion chamber 30 so that the flow of combustion gasses, represented by arrows 68, is diverted from the combustion chamber 30 to the turbine 20 section of the engine. More specifically, in this particular engine, the direction of the combustion gas flow is reversed with respect to the orientation of the turbine engine 10 as the combustion gas is directed from the upstream section 55 of the transition liner 53 to the downstream section 57 of the transition liner 53 to the direction of flow through the turbine 20. To assemble the above components, the inner edge of the upstream section 55 of the transition liner assembly 51 may be generally slip fit, or otherwise fastened, over or adjacent to the outer edge 34 of the combustion chamber 30 downstream section 32. To improve the longevity and performance of the combustion chamber, the outer surface of the downstream section 32 of the combustion chamber 30 can be coated with a hardening material, which can be a chrome carbide metal spray.

The forces applied to an operational gas turbine engine, especially when affixed to the wing of an aircraft, can result in vibration between internal engine components. Vibration between the transition liner and the hardened edge of the combustion chamber 30 can result in damage or wear (otherwise called erosion or fretting) of the edge of the transition liner.

The prior art depicted in FIG. 1B shows erosion damage in the form of a ledge 59 that has been worn into the upstream section 55 of an eroded transition liner 53. As shown, the erosion-induced ledge 59 has degraded the connection between the upstream section 55 of transition liner 53 and the outer downstream section 32 of the combustion chamber 30, such that some combustion gasses 68 may escape, represented by arrows 65. Akin to a blown head gasket in a conventional automobile engine, the escape of gasses in an undesired location results in degraded engine performance and may shorten the operational life expectancy of the turbine engine or downtime and cost related to engine maintenance. However, it should be appreciated that despite this drawback, conventional gas turbine engines generally are operationally safe and reliable.

Upon a loss of gas turbine engine performance or as required by routine turbine engine maintenance, disassembly of the turbine engine occurs and the transition liner assembly may be inspected. When an upstream annular section of the transition liner is identified as being damaged by erosion (for example by visual inspection), the entire transition liner is removed and replaced. The replacement transition liner is subject to the same erosion damage and life expectancy drawbacks as the old eroded liner. Thus, eroded transition liners may cause maintenance expense and engine downtime.

Hence, there is a need in gas turbine engines for a combustor-to-turbine transition liner assembly, and a related repair method, that overcomes one or more of the drawbacks identified above. The present invention satisfies one or more of these needs.

SUMMARY OF THE INVENTION

The invention provides a repair for a damaged gas turbine engine transition liner assembly that diverts combustion gases from a combustion section of the engine a turbine section in the engine. In addition, an improved damage-resistant transition liner assembly for a gas turbine engine also is provided.

In particular, and by way of example only, one preferred embodiment of the repair includes a method of repairing a damaged edge portion of a transition liner from a gas turbine engine. The damaged edge portion of the transition liner is removed and a replacement edge portion made of a first material is made or provided. The replacement edge portion is then joined to the remaining portion of the transition liner. A layer of a second, damage resistant material is applied to a portion of the replacement edge portion. This second material is more damage or erosion-resistant than the original liner edge material. The second material may be applied before, during or after the joining of the replacement edge portion.

In optional details of the method, the method may include removing the old transition liner assembly from the engine, repairing it as set forth above, and reinstalling it in the engine. Likewise, the method may include the use of a chromium carbide material for the damage resistant layer and/or a material that has the same or similar characteristics as the material on the annular combustion chamber edge at the point of contact. The layer may have a thickness of from about 0.002 inches to about 0.012 inches. A heat treatment also may be used prior to the joining of the replacement edge portion. Also, if the transition liner has one or more attached supports, the method may also include replacing some or all of these supports.

In yet another embodiment, an improved damage-resistant transition liner for a gas turbine engine is provided that guides combustion gasses between an opening into the turbine section of the engine and a combustion chamber. The transition liner has an annular edge portion and a transition liner body made of a first material. The transition liner body has a first edge portion, a second edge portion and a curved wall therebetween. The first edge portion of the transition liner is shaped to fit adjacent to the annular edge portion of the combustion chamber. The second edge portion is shaped to fit adjacent to the opening of the turbine section of the engine, such that the curved wall of the body guides the flow of combustion gasses from the combustion chamber to the turbine section of the engine. The first edge portion of the transition liner has a layer of a second, damage-resistant material in a position located to contact the annular edge portion of the combustion chamber. This second material is more damage resistant than the first material. However, it should be appreciated that the layer of second material could comprise the entire thickness of the first edge portion and could be joined to the first material comprising the rest of the transition liner.

In alternative embodiments, the layer of second material on the transition liner may be a chromium carbide material. Furthermore, the thickness of the second material layer may be from about 0.002 inches to about 0.012 inches.

The gas turbine engine transition liner of claim 3, wherein the erosion-resistant material comprises a mixture of about 24 to 26 percent by weight Nickel Chromium Alloy and of about 74 to 76 percent by weight Chromium Carbide.

These and other objects, features and advantages of the preferred method and apparatus assembly will become apparent from the following detailed description, taken in conjunction with the accompanying drawings which illustrate, by way of example the principles of the invention.

DETAILED DESCRIPTION

Before proceeding with the detailed description, it is to be appreciated that the present invention is not limited to use or application with a specific type of gas turbine engine. Thus, although the present invention is, for conveniences of explanation, depicted and described with respect to an aircraft reverse flow gas turbine engine, it will be appreciated that this invention may be applied to flow transition liners used in other gas turbine engine applications.

Figure 2:
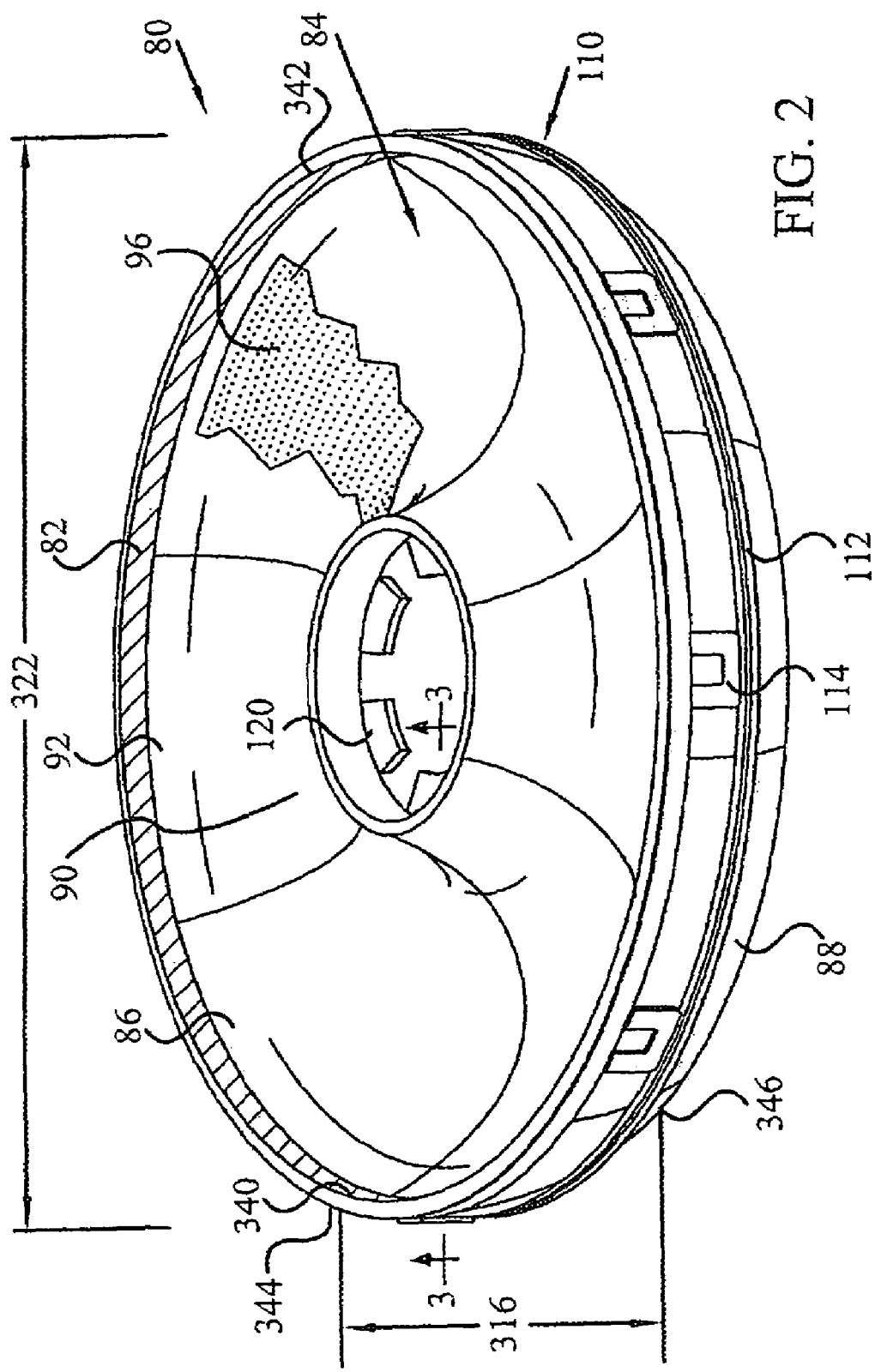
FIG. 2 is a perspective view of a transition liner assembly according to an embodiment of the present invention.
Figure 3:
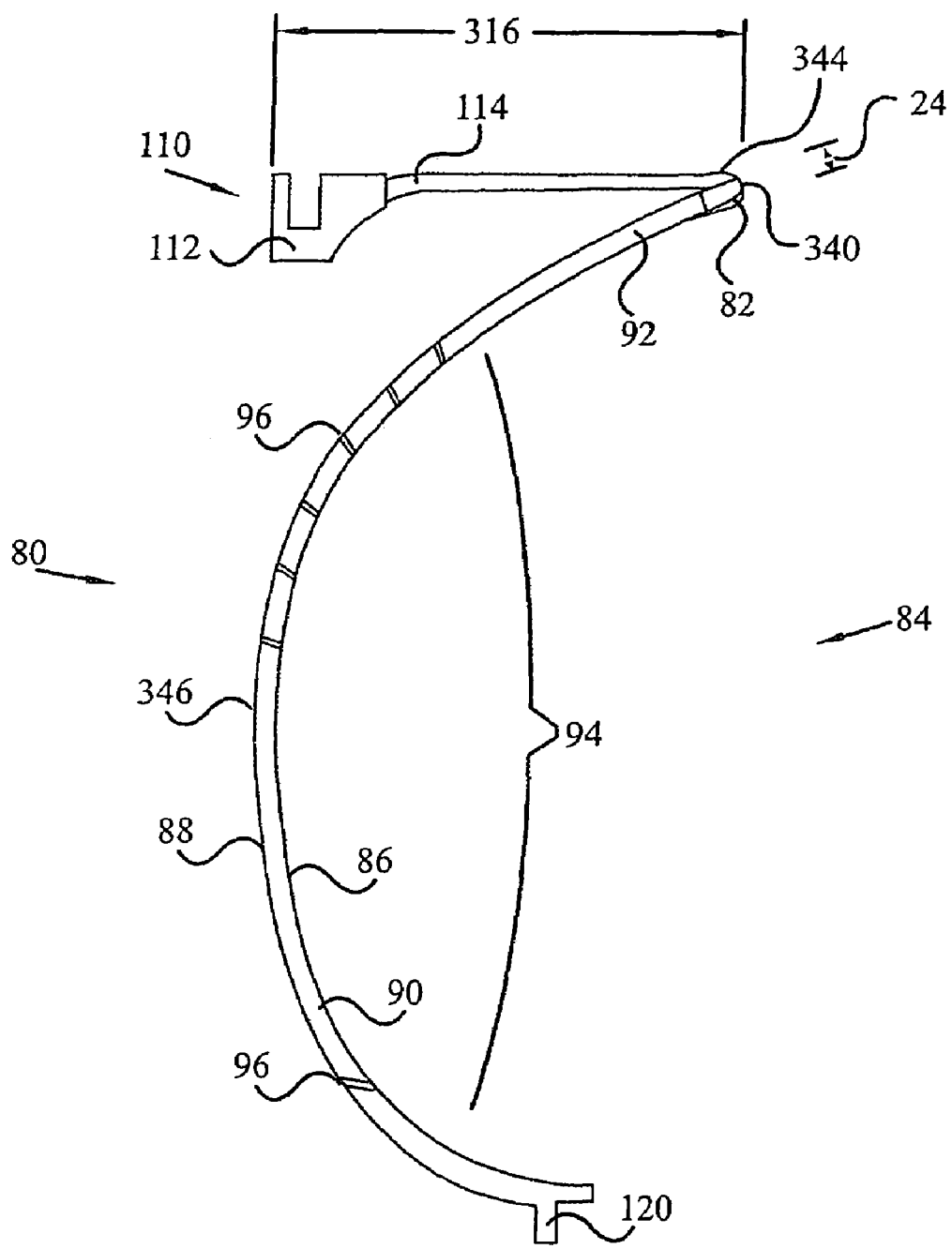
FIG. 3 is a partial cross-sectional view of the transition liner assembly, taken in the area of line 3 in FIG. 2.

Turning now to the description and with reference first to FIGS. 2 and 3, a preferred improved erosion-resistant transition liner assembly 80 is shown as one embodiment of the invention. The erosion-resistant transition liner assembly 80 has a concave and circular transition liner body 84 and a support assembly 110. The transition liner body 84 has an exterior surface 88 and opposite thereto an interior surface 86, openings 96, an upstream section 92, a downstream section 90, and a layer of erosion resistant material 82 located on the upstream section 92. The support assembly 110 has a support ring 112 and support members 114. While the openings 96 are only shown on a portion of the transition liner body 84, this is only for the sake of simplicity. The openings 96 can extend across the body 84, or in some applications the transition liner body 84 may not have any such openings.

Preferably, the transition liner body 84 is made of an alloy that combines excellent high temperature strength and resistance to oxidation at high temperatures. The preferred alloy is a nickel-chromium-tungsten-molybdenum alloy more commonly known in the industry as a Haynes alloy, although any material for a suitable application may be used. In one embodiment for a particular application, the transition liner body 84 has a diameter of about 21.198 to 21.210 inches, a length of about 2.830 to 2.850 inches, and a thickness of 0.050 inches. For purposes of discussion, it should be understood that the diameter 322 of the transition liner body 84 is measured from inside edge 340 to inside edge 342, and that the length 316 is measured from the upstream edge 344 of upstream section 92 to the lowest area 346 of the downstream section 90.

Redirection of combustion gasses from the engine's combustion chamber to the one or more turbines in other parts of the engine is accomplished by the transition liner's curved or concave downstream section 90, which curves radially inwardly from the upstream section 92, toward the centerline of the engine. The specific curvature and overall shape of the transition liner body 84 of course depends on the design and location of the particular gas turbine engine components.

As can be seen, the damage-resistant transition liner assembly 80 incorporates a layer of erosion-resistant material 82 located around the circumference of the inner surface 86 at the upstream section 92 of the transition liner assembly 80. It should be appreciated that a substantially similar erosion-resistant layer may also be located on the downstream section 32 of the combustion chamber 30, proximate to the point of contact between the transition liner assembly 80 and the combustion chamber 30 (See FIG. 4). Furthermore, depending on the configuration of the combustion chamber 30 and the transition liner assembly 80, the erosion-resistant layer 82 may not be continuous around the whole circumference on any one surface of the components.

Figure 4:
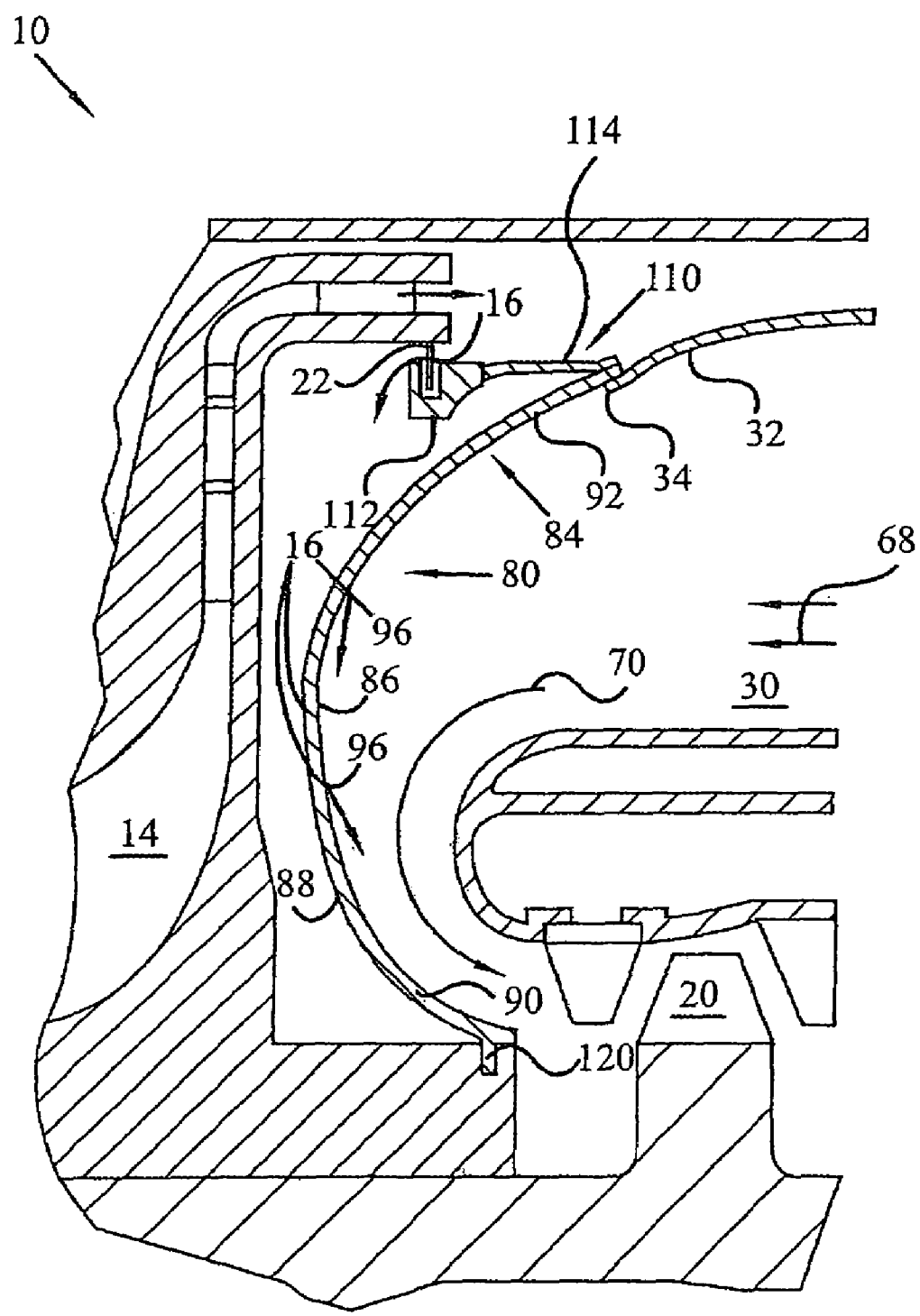
FIG. 4 is a simplified partial cross-sectional view of transition liner assembly of FIG. 2, shown installed in an exemplary gas turbine engine.

More specifically, the layer of erosion resistant material 82 on the interior surface 86 of the upstream section 92 of the transition liner body 84 preferably possesses the same or similar physical characteristics as the downstream section 32 of the combustion chamber 30 (see FIG. 4). In at least one preferred embodiment of the present invention, this erosion-resistant material is chrome carbide metal, although other materials suitable for particular gas turbine engine applications may be used. The preferred chrome carbide metal is preferably a mixture of about 24 to 26 percent by weight Nickel Chromium Alloy, Type I, Class I, and of about 74 to 76 percent by weight Chromium Carbide, Type II Class I. In at least one preferred embodiment, the layer of erosion-resistant material 82 is about 0.002 to 0.012 inches thick.

| Element | Percentage by weight | |
|---|---|---|
| | Min | Max |
| TYPE I, CLASS I | | |
| Chromium | 18.0 | 21.0 |
| Nickel | 76.0 | 80.0 |
| Iron | — | 1.0 |
| Carbon | — | 0.25 |
| Manganese | — | 2.5 |
| Silicon | — | 1.5 |
| TYPE II, CLASS I | | |
| Iron | — | 0.7 |
| Carbon | 12.5 | — |
| Silicon | — | 0.1 |
| Chromium | 85.5 | — |

The addition of the erosion resistant material 82 to the upstream section 92 of the transition liner assembly 80, results in a transition liner assembly 80 or transition liner body 84 that is comprised of first material providing strength and oxidation resistance and a second material providing resistance to erosion from contact with the combustion chamber liner 32 and/or from the hot combustion gases.

As also shown in FIG. 3, the primary section 94 of downstream section 90 of the transition liner body 84 has openings 96 to permit compressed air provided to the exterior surface 88 of the transition liner body 84 to pass through to cool the interior surface 86 of the transition liner body 84. In particular, the openings 96 allow a buffering layer of cool air to pass from the exterior surface 88 to the interior surface 86 of the transition liner body 84, and then across the interior surface 86 generally in a direction of travel from the upstream section 92 to the downstream section 90, thereby flowing with the hot combustion gasses 68 from the combustion chamber 30 into the turbine 20. This flow of cooler air across the interior surface 86 reduces the direct contact of the hot combustion gasses 68 with interior surface 86 of transition liner body 84 (see FIG. 4).

The support and retainer assembly 110 is also preferably provided and mounted to the exterior portion of the upstream section 92 of the transition liner body 84. In the embodiment depicted, the preferred support assembly 110 is comprised of the support ring 112, and the support members 114, however, under appropriate circumstances an annular shroud or other support structure may be used.

FIG. 4 depicts a partial cross section of an exemplary annular gas turbine engine 10 which may include an embodiment of the present invention. As is shown, the curvature of the transition liner body 84 is arranged to transition the flow of combustion gasses 68 from a first direction, generally represented by arrows 68 to a second direction, generally represented by arrow 70. Further, the support assembly 110 is shown to engage internal engine support structure 22, thereby mounting the transition liner assembly 80 in its position adjacent to the annular combustion chamber 30 of the engine. Compressed air or gas, represented by arrows 16, is provided to the exterior surface 88 of the transition liner body 84 and flows through openings 96 to reach the interior surface 86 of the transition liner body 84. The erosion resistant material 82 on the interior surface 86 of upstream section 92 resists wear from contact with the outer edge 34 of downstream section 32 of the combustion chamber 30. This advantageously allows the engine operator to have reduced repair expenses and related downtime.

Having described one embodiment of an erosion-resistant transition liner assembly 80, another embodiment of the invention is related to a method of repairing an erosion-damaged transition liner assembly 280, as is illustrated in FIGS. 5 through 10. It will be appreciated that the described method need not be performed in the order in which it is herein described, but that this description is merely exemplary of one method of repairing a transition liner assembly 280 in accordance with an embodiment of the present invention. Except for the first "2" in the reference numerals used in these Figures above, the remainder of the numerals are similar to those used in the other Figures to indicate similarity.

Figure 1:
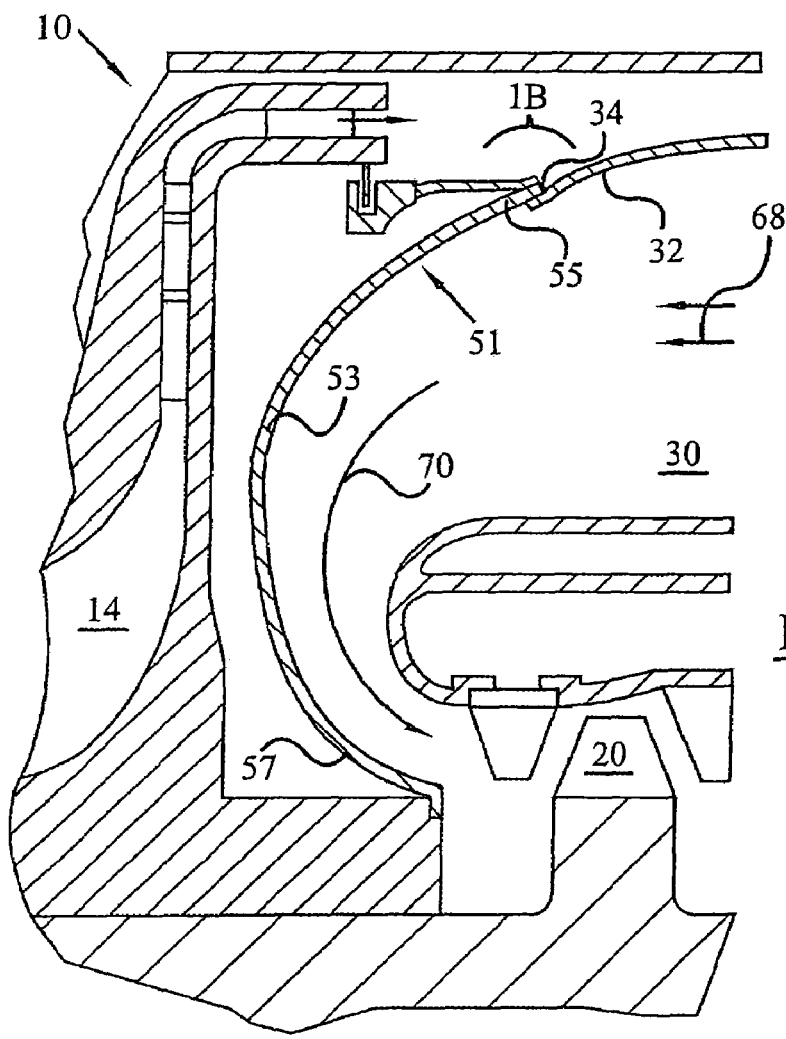
FIG. 1 is a partial cross-sectional view of a prior art combustor-to-turbine transition liner assembly.
Figure 1B:
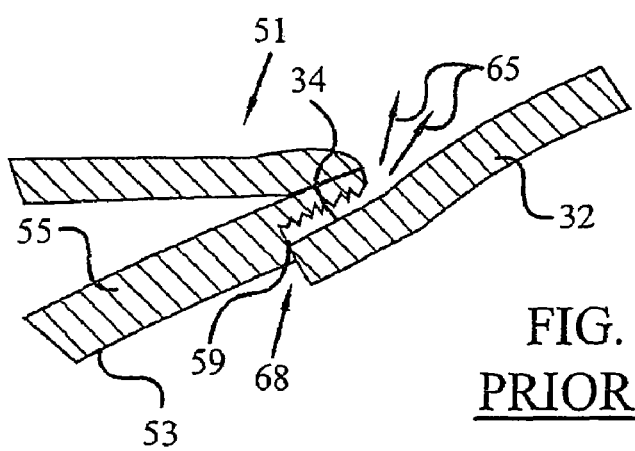
FIG. 1B is a detailed cross-sectional view of the prior art combustor transition liner assembly connection shown in FIG. 1, taken in the area of bracket 1B in FIG. 1.
Figure 5:
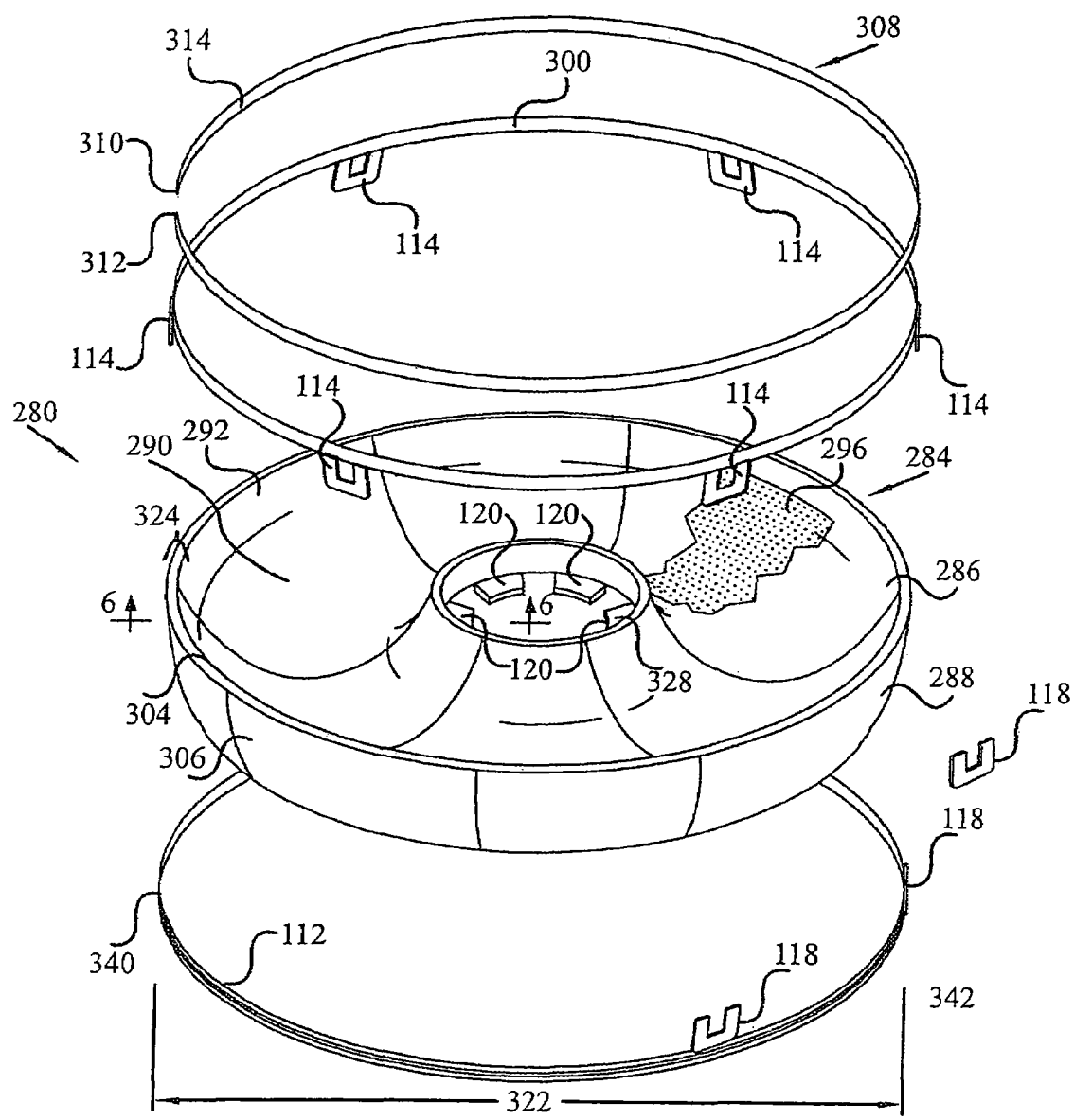
FIG. 5 is an exploded perspective view of the transition liner assembly relating to a repair process embodied by the present invention.
Figure 6:
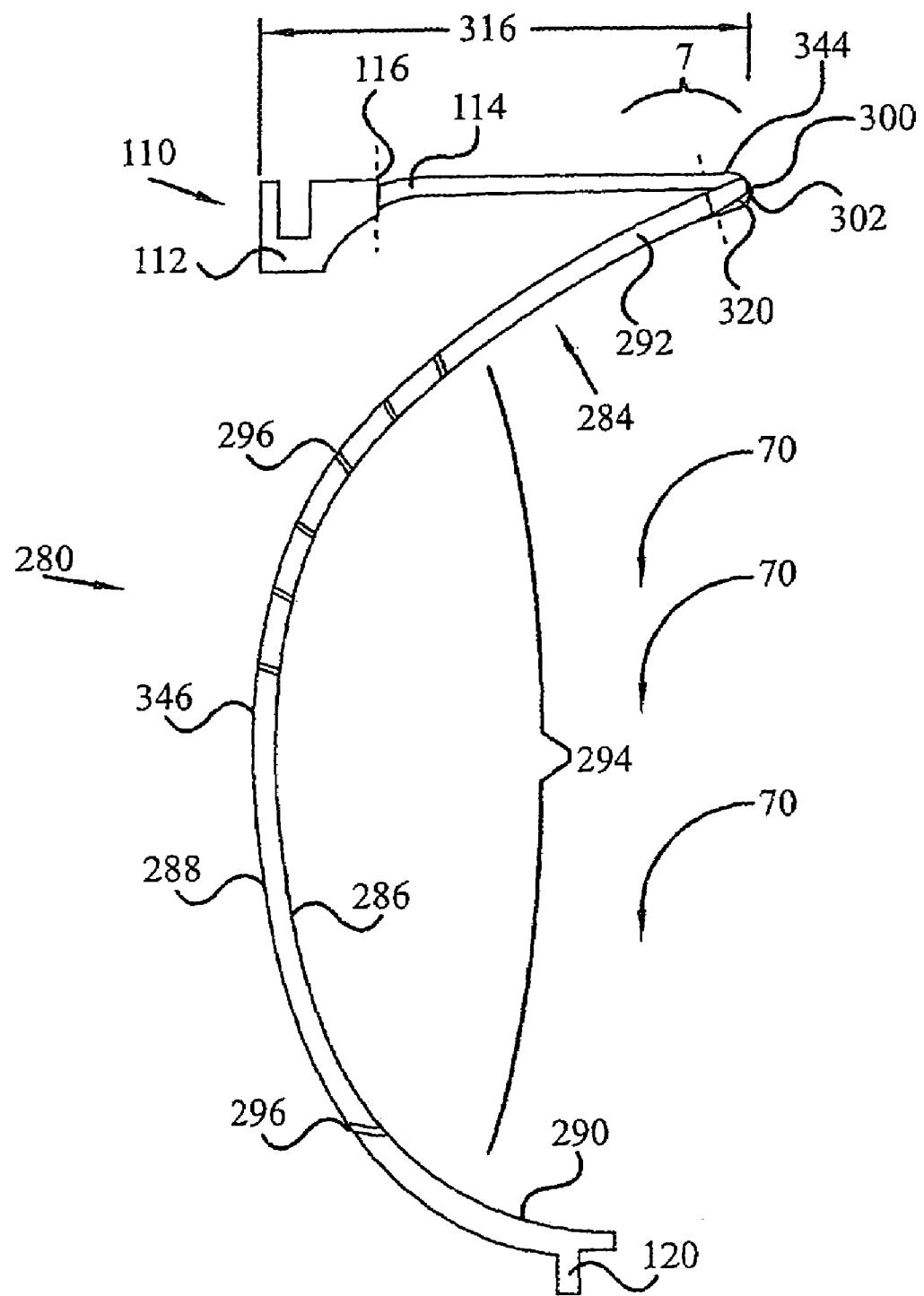
FIG. 6 is a partial cross-sectional view of a repaired transition liner assembly.

With respect to FIGS. 5 and 6, the transition liner assembly 280 repaired under the present invention has a curved or concave transition liner body 284 with an exterior surface 288 and an interior surface 286 that has been damaged by vibratory contact between the transition liner assembly and the combustion chamber, and/or exposure to hot gas turbine engine combustion gasses (See FIG. 1B). Except for the erosion damage, the transition liner assembly 280 in its unrepaired configuration can be essentially the same as that 51 shown in FIG. 1 or that 80 shown in FIG. 2, without the layer of erosion-resistant material 82. The transition liner body 284 also has a downstream section 290 extending radially inwardly from the upstream section 292. The transition liner assembly 280 also has a support and retainer assembly 110 mounted to the exterior portion of the upstream section 292 of the transition liner body 284. In the preferred embodiment depicted, the support assembly 110 has a support ring 112 and support members 114. The primary section 294 of downstream section 290 of the transition liner 284 may have a plurality of openings 296 to cool the interior surface 286 of the transition liner body 284, as described above.

Figure 7:
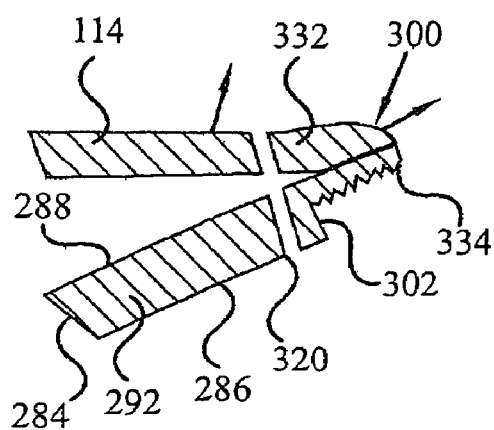
FIG. 7 is a partial cross-sectional view of the damaged transition liner section of FIG. 1B being removed.
Figure 8:
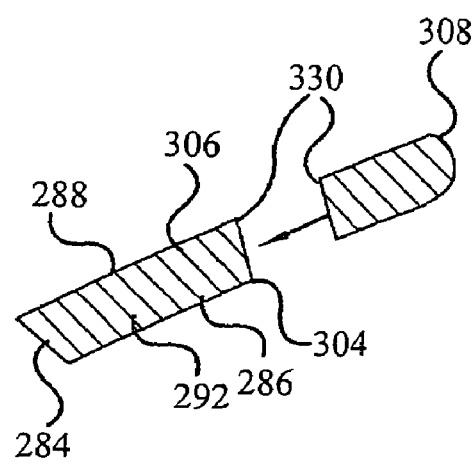
FIG. 8 is a partial cross-sectional view of a replacement transition liner section being attached.

After having described the damaged transition liner assembly 280 in need of repair, the repair process will now be described. The support assembly 110 is removed, preferably by cutting by laser or other know cutting tools, at or near to the original weld joint 116 between the support members 114 and the support ring 112 (see FIG. 6). Under appropriate circumstances, other methods of cutting may be employed such as grinding or sawing or clipping. As shown in FIG. 7, the annular end section 300 of upstream section 292 of the transition liner body 284 has the erosion damage 302. This annular end section 300 is removed from the transition liner body 284, preferably by cutting, such as by laser beam cutting, though under appropriate circumstances other ways of cutting may be employed such as grinding, sawing, or other suitable cutting tools or methods. Preferably, the cutting is performed at a location 320 below the erosion damage on the end section 300 of the upstream section 292 of the transition liner body 284. In particular, the annular, or ring shaped, end section 300 is preferably removed by cutting at location 320 approximately at least 0.400 inch from the tip of the upstream end section 300 of the transition liner 284. Of course, this location of cutting will vary depending on particular applications. Removal of the annular end section 300 generally also removes part of and shortens support members 114 as a section 332 of a support member may be joined to the removed section 334 of transition liner body 284.

Preferably, a finishing process is applied to the cut edge 304 (shown in FIGS. 5 and 8) of the remaining transition liner section 306. This process could include treatment of the edge 304 with a light abrasive material to remove the laser recast layer and or other unwanted material remaining from the cutting process.

At least one replacement ring 308 section is then obtained and installed. This replacement ring 308 may be formed by any process including by forming sheet metal material. Preferably, the replacement ring 308 is made of sheet metal alloy that is substantially identical in thickness to that of the removed section 300, although the sheet metal used may have a different thickness (or thicknesses). Preferably the replacement ring 308 is formed from sheet metal alloy that combines excellent high temperature strength and resistance to oxidation at high temperatures. The preferred alloy is a nickel-chromium-tungsten-molybdenum alloy more commonly known in the industry as a Haynes alloy, although any material for a suitable application may be used. Preferably, the replacement ring 308 is made of substantially the same material as that of the remaining transition liner section 306.

As shown in FIG. 5, forming the replacement ring 308 can include joining ends 310 and 312 of the sheet metal alloy strip 314 to form the replacement ring section. Although other processes may be used to join the ends 310 and 312 of the alloy strip 314, in one preferred embodiment the ends 310 and 312 are joined by tungsten inert welding. Preferably, the weld joint is finished flush by grinding and or other treatments.

The replacement ring 308 is sized and shaped to be substantially similar in shape to that of the removed section 300 as it would have appeared prior to incurring the erosion damage. To aid in the sizing and shaping of the replacement ring 308 and to provide a flush fit with the original transition liner section 306, the replacement ring 308 and the original transition liner section 306 may be heat-treated using a conventional process, such as a conventional vacuum heat treatment process. When utilizing a vacuum heat treatment process the vacuum is preferably about a $10^{-3}$ mm Hg minimum vacuum environment heated to preferably about 2025 to 2075 degrees Fahrenheit (1107 to 1134 degrees Centigrade). The replacement ring 308 and original transition liner section 306 are exposed to this preferred vacuum environment for at least 15 minutes. The heat treating process also provides a proper surface for welding, as it can remove materials deposited by combustion gasses on the remaining section of the original transition liner section 306. The heat treating parameters will of course vary depending on the materials used and the specific application.

Referring once again to FIG. 8, the replacement ring 308 is joined to the original transition liner section 306 to achieve an improved and repaired restored transition liner body 284. In a preferred embodiment, the joining of the replacement ring 308 to the original transition liner section 306 is accomplished by tungsten inert welding, preferably along the exterior surface 330 of the union of these pieces. Under appropriate circumstances, alternative joining methods may be employed. Preferably, the weld joint is hand finished to blend the weld to the interior and exterior contours of the transition liner 284.

Figure 9:
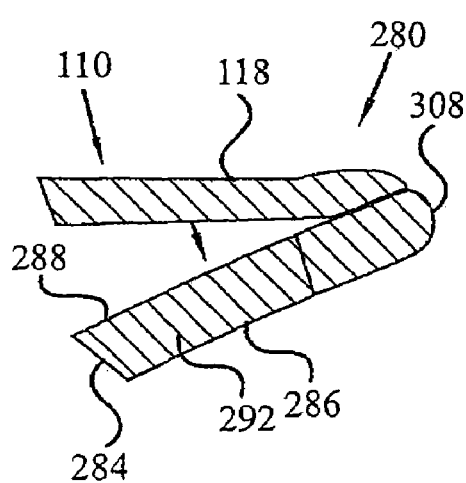
FIG. 9 is a partial cross-sectional view of the transition liner support being attached to the repaired transition liner section.

With respect to FIG. 9, a repaired and improved transition liner assembly 280, free of erosion damage in the replacement ring area, is achieved by joining the support assembly 110 to the improved and repaired transition liner body 284. Further, during such assembly, it is preferred to attach new support members 118 to the support ring 112 (see FIG. 5) in place of original support members 114 which have been shortened by removal of annular section 300 as shown in FIG. 7. In one preferred embodiment there are six such new support members 118.

To insure proper realignment and nesting of the repaired transition liner assembly 280 to the combustion chamber 30 within the gas turbine engine 10 (see FIG. 4), the radial orientation of new support members 118 may be substantially identical to the radial orientation of the original support members 114. This orientation, commonly referred to as clocking, is keyed to a master inner support member 120, identified in FIG. 5 as 328. In short, if the interior surface 290 of the transition liner assembly 280 is viewed directly from above as if looking at the face of a clock with master inner support member 328 at the 12:00 position, the new support members 118 preferably appear in substantially the same locations about the edge of the transition liner assembly 280 as the original support members 114.

The support members 118 may be joined to the support ring 112 to establish the support assembly 110, prior to the support assembly 110 being coupled to the transition liner 284. However, under appropriate circumstances the support members 118 may be joined to the improved and repaired transition liner body 284 before support ring 112 is joined to the support members 118. Preferably all such joining performed in assembling the new transition liner assembly 280 is by welding, including without limitation tungsten inert welding. Other methods of joining may be employed under appropriate circumstances.

The improved and repaired transition liner assembly 280 is sized and shaped before it is installed in the gas turbine engine. This sizing and shaping is performed to insure that the transition liner assembly 280 is substantially similar in dimensions of contact surfaces to the original transition liner assembly. The sizing and shaping can be performed with a heat treatment such as that described above and/or other manufacturing techniques for forming, adding or removing material to achieve a predetermined dimension.

In one preferred embodiment, the improved and repaired erosion-resistant transition liner assembly 280 is sized and shaped to a preferred horizontal length 316 (see FIG. 6) of about 2.830–2.850 inches, and a preferred overall internal upstream diameter (see FIG. 5) of between about 21.198 to 21.210 inches. Under appropriate circumstances, it may be desired to perform fluorescent penetration inspection of the transition liner assembly 280.

Figure 10:
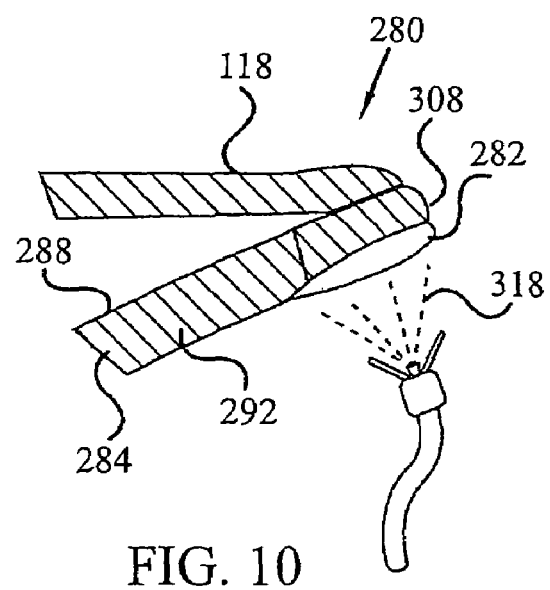
FIG. 10 is a partial cross-sectional view of an erosion resistant material being applied to the replacement transition liner section of FIGS. 8 and 9.

As shown in FIG. 10, a layer of erosion resistant material 282 is applied to the inner surface of the attached replacement ring 308. This material can be an erosion-resistant metallic compound, such as the chrome carbide metal spray described above. Preferably, applying the erosion-resistant material 282 achieves an erosion resistant layer 0.002 to 0.012 inches thick, bonded to, and/or specifically infused to the inner surface of replacement ring 308. Under appropriate circumstances, a thicker layer of erosion-resistant material may also be used. Preferably, the erosion-resistant material 282 is applied by a thermal spray process 318 such as a plasma spray process.

In one preferred embodiment, the thermal spray process 318 is a plasma spray process. It is understood and appreciated that in general a plasma spray process is primarily the application of molten or heat softened material onto a surface to provide a coating. Generally, the material intended to form the coating is in a power form, injected or otherwise delivered into a high temperature plasma flame (generally produced by high voltage discharge through plasma gas such as argon, nitrogen, hydrogen, or helium), where the powder material is rapidly heated and accelerated to a high velocity. The heated material impacts the substrate surface of the target to be coated and rapidly cools forming a dense coating with high bond strength. Other methods of adding material can also be used, such as laser powder fusion welding or other processes known in the industry.

Before the erosion-resistant material 282 is applied, the overall diameter of the transition liner assembly 280 is generally between 21.120–21.222 inches, so as to accommodate the thickness of the erosion resistant material (generally between about 0.002–0.12 inches) and to achieve a finished overall diameter of between 21.198 to 21.210 inches for one specific application. While these dimensions are provided for a specific application it should be appreciated that these dimensions could vary based on the gas turbine engine transition liner being repaired. After the foregoing is accomplished, the entire repaired transition liner assembly 280 is installed back into the gas turbine engine in a manner similar to the installation of a new transition liner assembly.

As discussed above and shown in FIG. 5, the transition liner 284 may or may not incorporate original cooling air openings 296 in downstream section 290. If the openings 296 are present, the repair technician may mask the cooling air openings 296 prior to applying the erosion resistant material 282 to protect these cooling air openings 296 and minimize undesired application of the erosion-resistant material.

This repair and improvement to resist erosion is advantageously cost effective and comparatively less time consuming then the remanufacture of an entire new transition liner body and/or assembly.

Having described the repair process, it will be appreciated that an unused, and/or undamaged transition liner assembly may be enhanced to become an erosion resistant transition liner assembly 80 by applying the same erosion-resistant material 282 to the same portion of the upstream section 292. Removal of an annular section 300 of the upstream section 292 is understood to be superfluous as a new transition liner will not have suffered any erosion damage. In addition, a completely new erosion-resistant transition liner assembly 80 can be made that has the layer of erosion resistant material 82 incorporated during the initial manufacturing process.

While the invention has been described with reference to the preferred embodiments, it will be understood by those skilled in the art that various changes may be made and equivalents may be substituted for the elements thereof and steps thereof without departing from the scope of the present invention. In addition, many modifications may be made to adapt to a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

I claim:

1. A method of repairing a damaged edge portion of a transition liner of a gas turbine engine, comprising:
   removing the damaged transition liner from the engine;
   removing the damaged edge portion of the transition liner;
   providing a replacement edge portion made of a first material;
   joining the replacement edge portion to the remaining portion of the transition liner;
   applying a layer of a second material to a portion of the replacement edge portion, the second material being more damage-resistant than the original transition liner material; and
   mounting the repaired transition liner in the gas turbine engine.

2. The method of claim 1, wherein the replacement edge portion is a ring shaped section.

3. The method of claim 1, wherein the joining of the replacement edge portion is accomplished by tungsten inert welding.

4. The method of claim 1, further comprising attaching at least one support assembly to the replacement edge portion of the transition liner.

5. The method of claim 4, wherein the attaching of the at least one support assembly to the replacement ring section liner further comprises replacing the support members attached to a support ring being part of the support assembly.

6. The method of claim 1, wherein the removing of the damaged edge portion of the transition liner is by laser cutting.

7. The method of claim 1, wherein the joining of the replacement edge portion further comprises heat treating the replacement ring and the transition liner before such joining.

8. The method of claim 7, wherein such heat treatment is applied in at least a $10^{-3}$ mm Hg minimum vacuum environment at about 2025 to 2075 degrees Fahrenheit.

9. The method of claim 1, wherein joining of the replacement edge portion includes sizing and shaping the replacement edge portion to be substantially similar in size and shape to factory supplied undamaged transition liner, except for a certain space left for the application of the second material.

10. The method of claim 1, wherein the damage-resistant second material is applied to a radially inner surface of the replacement ring section.

11. The method of claim 10, wherein application of the second material comprises applying a chromium carbide metal.

12. The method of claim 1, wherein the second damage-resistant material is applied by plasma spray.

13. The method of claim 1, wherein the second damage-resistant material is applied to a thickness of between about 0.002–0.012 inches.

14. The method of claim 1, wherein the applying of the layer of the second material is done before the joining of the replacement edge portion to the remaining portion of the transition liner.

15. The method of claim 1, wherein the applying of the layer of the second material is done after the joining of the replacement edge portion to the remaining portion of the transition liner.

16. A method of repairing a damaged edge portion of a transition liner of a gas turbine engine, comprising:
   removing the damaged edge portion of the transition liner;
   providing a replacement edge portion made of a first material;

joining the replacement edge portion to the remaining portion of the transition liner; and applying a layer of a second material to a portion of the replacement edge portion, the second material being more damage-resistant than the original damaged edge portion of the transition liner assembly.

17. The method of claim 16, wherein the applying of the layer of the second material is done before the joining of the replacement edge portion to the remaining portion of the transition liner.

18. The method of claim 16, wherein the applying of the layer of the second material is done after the joining of the replacement edge portion to the remaining portion of the transition liner.

19. A method of repairing a damaged radially inner surface of an annular edge portion of a transition liner assembly adjacent to an annular edge of a gas turbine engine combustion chamber, the transition liner assembly having a transition liner body joined to a support assembly, the method comprising:

removing the damaged transition liner from the engine;

removing the damaged edge portion of the transition liner assembly by cutting a portion of the transition liner body from the transition liner assembly;

providing a curved replacement edge portion made of a first material, the replacement edge portion being sized to fit onto the remaining portion of the transition liner body;

joining the replacement edge portion to the remaining portion of the transition liner body;

applying a layer of a second material to a portion of the radially inner surface of the replacement edge portion, the thickness of the layer sized so that the inner diameter of the annular edge of the repaired transition liner assembly is sufficient to mount the transition liner assembly against the annular edge of the combustion chamber; and mounting the repaired transition liner assembly in the gas turbine engine.

20. The method of claim 19, wherein the second erosion resistant material is chromium carbide material.

21. The method of claim 19, wherein the mounting of the repaired transition liner assembly includes locating the annular edge portion of the transition liner assembly concentrically about the annular edge of the combustion chamber.

\* \* \* \* \*